Figure 3:
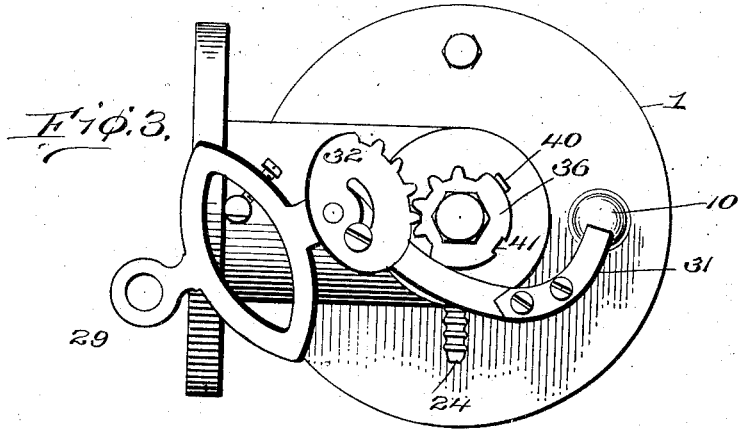

W. T. DAWSON.
CARBURETER.
APPLICATION FILED FEB. 12, 1910.
983,541.
Patented Feb. 7, 1911.
3 SHEETS—SHEET 1.
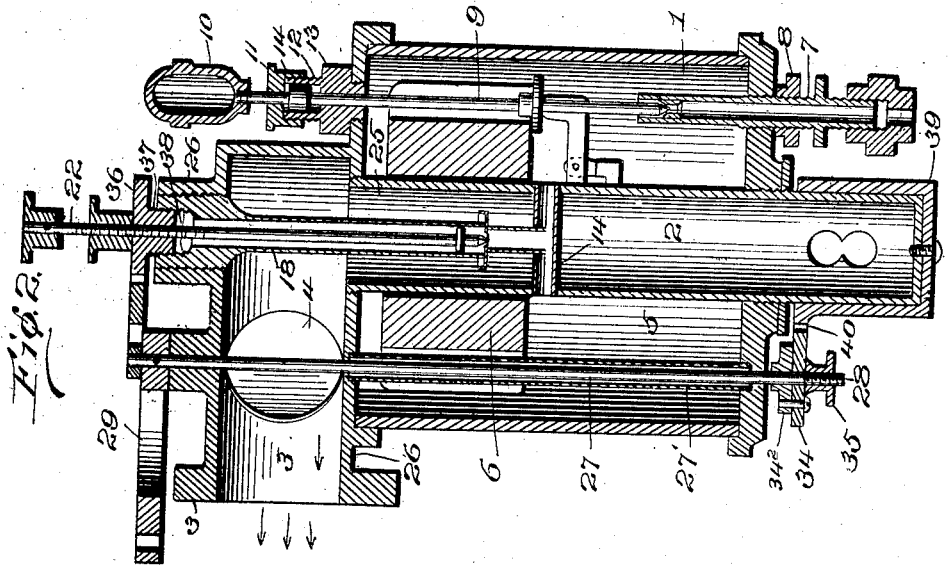
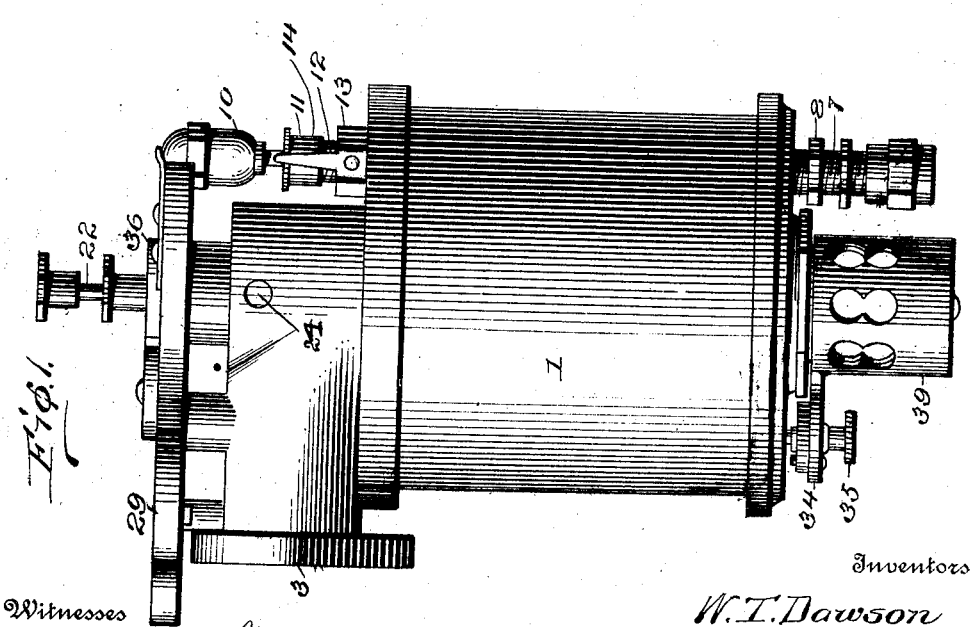
Witnesses
Inventors
W. T. Dawson
By John S. Duppie
Attorneys

W. T. DAWSON.
CARBURETER.
APPLICATION FILED FEB. 12, 1910.

983,541.

Patented Feb. 7, 1911.
3 SHEETS—SHEET 2.

Witnesses
J. M. Fowler Jr.
R. P. Duffie

Inventor
W. T. Dawson
By John S. Duffie
Attorney

W. T. DAWSON.
CARBURETER.
APPLICATION FILED FEB. 12, 1910.
983,541.
Patented Feb. 7, 1911.
3 SHEETS—SHEET 3
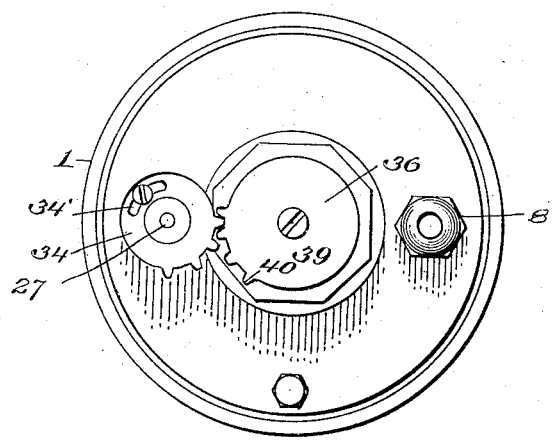
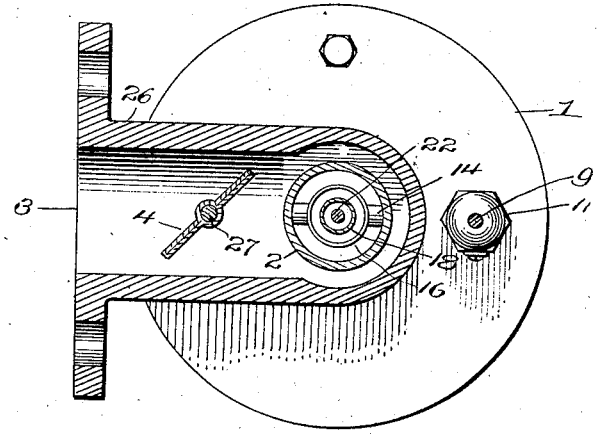
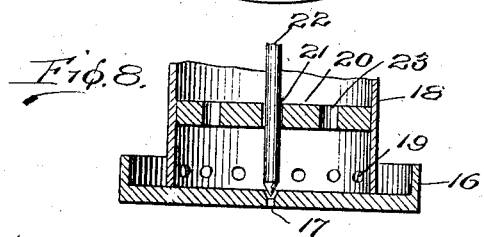
Witnesses
J. M. Fowler Jr.
R. P. McDuffie
Inventor
W. T. Dawson
By John S. Duffie
Attorney

UNITED STATES PATENT OFFICE.

WILLIAM T. DAWSON, OF HELENA, ARKANSAS.

CARBURETER.

983,541.

Specification of Letters Patent.

Patented Feb. 7, 1911.

Application filed February 12, 1910. Serial No. 543,561.

*To all whom it may concern:*

Be it known that I, WILLIAM T. DAWSON, a citizen of the United States, residing at Helena, in the county of Phillips and State of Arkansas, have invented certain new and useful Improvements in Carbureters, of which the following is a specification.

My invention has relation to carbureters and especially to one whose fuel supply and air supply are regulated simultaneously and mechanically.

The carbureters now on the market are found defective when put into practical use as there is no means employed to mechanically and simply obtain the proper mixture and proper quantity thereof necessary for the speed desired. My carbureter is designed to overcome all difficulties in this connection by mechanically and simultaneously regulating the fuel supply and the air supply to the mixing chamber and the mixture supply from the carbureter to the engine cylinders.

Another object of my device is to provide novel means for atomizing the gasolene. By the means which I employ the gasolene is sprayed directly by the air coming into contact therewith in a novel manner which will be fully brought out hereinafter.

A further object of my device is the employment of means to positively close the fuel supply leading to the float chamber when the carbureter is not in use.

A further object of my invention is the introduction of a filtering medium within the float chamber of the carbureter to provide for the filtration of the gasolene contained therein.

It is pointed out that this carbureter is designed to control the engine at all speeds independently of the retarded or advanced spark. The manner of controlling the speed of the engine depends mainly upon the manipulation of the damper valve which is double acting, that is to say, the damper valve may be swung to its open position, then past such position. Before the valve is swung to the fullest open position the speed of the engine varies from a low to a fairly good speed but after the valve is swung past the fullest open position the speed of the engine may be varied, by means of said damper valve, from a medium speed to a very high speed, said damper valve at all times coöperating with the butterfly valve.

Thus it will be seen from the foregoing that the results obtained will be to secure the proper mixture at all speeds and the proper amount of the mixture at all speeds.

It will be noted that in the construction of my invention I do away with all fragile parts such as springs and spring valves, which are liable to get out of order easily.

Another object of my device is to provide an adjustable float valve seat and a special double adjustment for the float valve as will be fully described later.

To determine the exact adjustment of the butterfly valve in relation to the damper valve and fuel supply to the mixing chamber it will first be necessary to apply the device to an engine, as different engines will require slightly different adjustments.

A further object of my invention is to provide novel means for primarily atomizing the gasolene when starting the engine, especially when the engine is very cold, probably due to a long stand on a cold day. This is accomplished by attaching an ordinary hand pump to the nozzle 24 and forcing air into the conduit 2, thus spraying the gasolene, the vapor thereby caused passing into the engine cylinder or cylinders. The engine may then be started without the necessity of cranking.

With these objects in view my invention consists of the novel construction and arrangement of parts as are fully described in this specification, illustrated in the accompanying drawings forming a part thereof and particularly pointed out in the appended claims.

Figure 4:
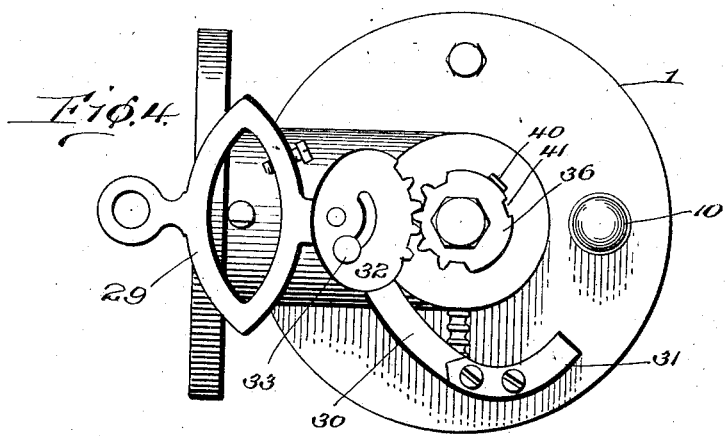
Figure 5:
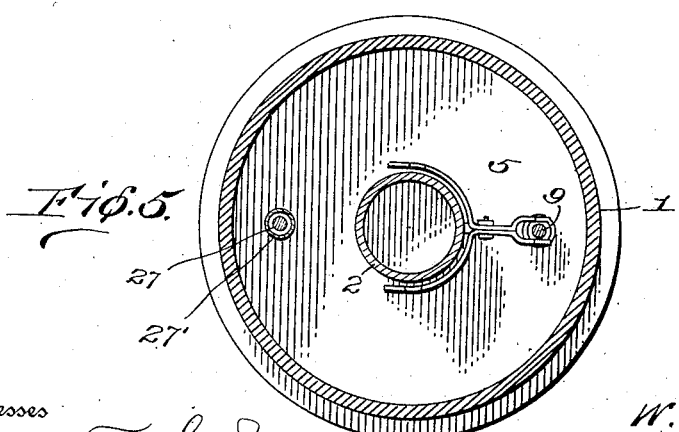

Reference being had to the drawings: Figure 1 is a side elevation of my invention. Fig. 2 is a vertical, sectional, transverse view thereof. Figs. 3 and 4 are top, plan views of my invention. Fig. 5 is a horizontal section of my device. Fig. 6 is a bottom plan view thereof. Fig. 7 is also a horizontal section of my invention taken through the passage leading to the engine cylinder. Fig. 8 is an enlarged, fragmentary, vertical, sectional view of the spray pan, the vertical air shaft and the needle valve.

Referring more particularly to the drawings my invention is described as follows:

The receptacle is provided with the vertical centrally located conduit 2 which is closed at its lower end but is provided with a plurality of 8-shaped perforations therein near its lower extremity. The conduit 2 communicates with the engine cylinder (not shown) by means of the passage 3 wherein is located the butterfly valve 4.

Surrounding the conduit 2 is the float chamber 5 provided with the usual float 6. This float controls the fluid level in the usual manner. An adjustment of the float valve seat may be had by revolving the fuel supply pipe 7, which is screw-threaded on its outer surface, until adjusted to a desired point and locking it in place by the lock-nut 8. The float-valve 9 may be adjusted in two ways. First by placing a greater or lesser amount of shot in the hollow bulb 10 or by an adjustment of the screw-cap 11. By adding to the shot in the bulb 10 it will be seen that the level of the gasolene in the receptacle will be caused to fall as the float valve 9 will be opened with greater difficulty. The adjustment of the screw-cap 11 is for the purpose of limiting the play of the float valve 9 or to positively close the same when desired. It will be seen that the more space allowed in the neck 12 of the nut 13, by the adjustment of the cap 11, the greater the movement of the enlargement 14 of the float valve 9.

Sometimes there is a waste of gasolene from the float chamber on carbureters now in use due to the float valve leaping from its seat under the influence of road or engine vibration and so failing to cut off the fuel, which promptly overflows. By the use of the float valve construction above described this nuisance will become impossible as the float valve may be adjusted, as stated, by means of the screw-cap 11 either while the engine is running or at a stop.

Communicating with the float chamber 5 and passing through the conduit 2 is a small pipe 14, provided with an upright extension 15 communicating and integral therewith. Mounted upon the upper end of the extension 15 is a pan 16 provided with a perforation 17 at the center thereof. Resting in the pan and extending upwardly is a vertical hollow air shaft 18 provided with a plurality of openings 19 near the lower end thereof. A partition 20 extends across the shaft, said partition provided with a central perforation 21 to provide for the passage and guidance of the needle valve 22 whose point enters the perforation 17 in the said pan. A series of perforations or openings 23 pass through the partition to admit of the passage of air down the shaft, which air is drawn in through the nozzle 24 from the atmosphere by the action of the engine. Only a small constant quantity of air passes into the mixing chamber 25 by this means, the quantity being only sufficient to atomize or spray the gasolene contained in the pan 16. The hollow air shaft 18 is enlarged at its upper end which enlarged portion is screw-threaded to engage the casing 26 of the passage 3.

A vertical rod 27 passes through the casing 26 of the passage 3 and also through the receptacle or float chamber 1 terminating in a threaded portion 28. Incasing the vertical rod 27 is a tubing 27', wherein rotates said rod, said tubing preventing leakage of the receptacle 1. Keyed to the upper end of this rod is a lever 29 provided with the curved portion 30. The curved portion is provided at its end with a flat metallic spring 31 which binds against the top of said bulb 10 when the carbureter is not in use and it is desired to positively cut off the supply of fluid to the float chamber. Also secured to the rod 27 within the passage 3 is the said butterfly valve 4, said valve being controlled by the action of this rod. Adjustably mounted upon the upper end of the rod is a gear 32 held normally against movement by the screw 33 which passes into the arm 30. Adjustably mounted to the lower end of the rod is a gear 34 held in position by the thumb-screw 35 upon said threads 28. Said last-mentioned gear is provided with a slot 34' through which passes a set-screw which enters a disk 34² secured to the rod 27. Intermeshing with the gear 32 is a third gear 36 encircling and secured to the needle valve 22. Said gear 36 is provided with a downwardly extending neck 37 which neck is screw-threaded and which threads engage the threads 38 of the enlarged upper end of the air shaft 18. Therefore when the rod 27 is revolved by the lever 29 the needle valve 22 is also caused to rotate. Encircling and covering the lower portion of the conduit 2 is a cap 39 provided with the gear teeth 40, which teeth engage the teeth of said gear 34 held to the rod 27. The cap 39 is provided with the same number of 8-shaped perforations therein, which are adapted to register with the perforations in the lower portion of the conduit 2. Thus when the rod 27 rotates it also likewise causes rotation of the cap 39, which cap with its 8-shaped perforations and the corresponding 8-shaped perforations of the conduit 2, constitute the said damper valve for the regulation of the air supply to the mixing chamber. Thus it will be seen that the air supply and the fuel supply to the mixing chamber and the amount of mixture allowed to pass to the engine from the mixing chamber are simultaneously and mechanically controlled by the lever 29. After the teeth of the gear 32 pass from intermeshed relation with the teeth of the gear 36, said gear 36 is held in a pre-determined position by the flat spring 40 engaged by the notch 42 in the gear.

Placed in the bottom of the receptacle 1, to the extent of ½ to ¾ of an inch deep is an anti-freezing solution for the purpose of filtering the gasolene. A proper substitute in warm weather for this medium is water.

Directions for preparing solution: In a pail of water place as much calcium chlorid as the water will absorb then dilute with an equal bulk of clean water. It will then be able to withstand a temperature of about 20 degrees below zero without freezing. Before the solution is used it may be tested for acidity by immersing therein a piece of blue litmus paper such as may be obtained from any druggist. If the paper turns red, denoting the presence of acid, a neutralizing medium should be added such as a small amount of slaked lime. This non-freezing solution does not affect the quality of gasolene and will not mix therewith in the float chamber and at the same time will filter the gasolene, absorbing all foreign matter such as may be found therein. This foreign matter will form a sediment in the bottom of the float chamber.

Having described my invention I may reserve the right to make such changes therein as do not depart from the spirit of my invention and as fall within the scope of the appended claims.

What I claim as new, is:

1. In a carbureter of the class described mechanically operative means for controlling the fuel supply and air supply to the mixing chamber and mixture supply to the engine, said means comprising a vertically extending rod passing through the float chamber, a lever secured to the upper end of the rod, means comprising gears interposed between the rod and the needle valve for the rotation of the latter, means interposed between the lower end of the rod and the air supply valve, the butterfly valve mounted upon the said rod.

2. In a carbureter of the class described mechanically and simultaneously operative means for controlling the fuel supply and air supply to the mixing chamber and mixture supply to the engine, said means comprising a vertically extending rod passing through the float chamber, a lever secured to the upper end of the rod, the fuel supply comprising a needle valve which is mounted in a gear provided with a threaded neck, an adjustable gear mounted upon the said rod and adapted to operate the gear of the valve, means interposed between the lower end of the rod and the air supply valve, the mixture supply to the engine being controlled by a butterfly valve mounted upon the rod.

3. In a carbureter of the class described comprising a receptacle, a centrally vertically disposed conduit passing therethrough, a transverse tube provided with a vertically disposed extension thereto communicating with the float chamber, a pan provided with a centrally located perforation upon the upper end of the extension, a needle valve, arranged for rotation, whose lower end enters the perforation in the pan, a vertically disposed air shaft incasing the needle, said air shaft communicating with the atmosphere by means of a nozzle, a plurality of perforations in the said shaft near the lower end thereof, means for the rotation of the needle and means for the guidance of the same.

4. In a carbureter of the class described comprising a receptacle, a centrally vertically disposed conduit passing therethrough, a transverse tube provided in the conduit with a vertically disposed extension thereto communicating with the float chamber, a pan provided with a centrally located perforation secured upon the upper end of the extension, a vertically extending needle valve, whose lower end enters the perforation of the pan, an air shaft incasing the needle, which air shaft communicates with the atmosphere by suitable means, a plurality of perforations in the air shaft below the plane of the rim of said pan, means for the adjustment of the valve and the guidance thereof.

In testimony whereof I affix my signature, in presence of two witnesses.

WILLIAM T. DAWSON.

Witnesses:
C. M. FORREST,
N. E. GARNER.